US012582930B2

(12) United States Patent
Neef et al.

(10) Patent No.: US 12,582,930 B2
(45) Date of Patent: Mar. 24, 2026

(54) SECONDARY ELEMENT AND FILTER SYSTEM

(71) Applicant: MANN+HUMMEL GmbH, Ludwigsburg (DE)

(72) Inventors: Pascal Neef, Trossingen (DE); Kevin Kohn, Grossbottwar (DE); Jan Jedlicka, Trebic-Tyn (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 466 days.

(21) Appl. No.: 18/366,198

(22) Filed: Aug. 7, 2023

(65) Prior Publication Data

US 2024/0042362 A1 Feb. 8, 2024

(30) Foreign Application Priority Data

Aug. 5, 2022 (DE) .......................... 102022119709.3

(51) Int. Cl.
B01D 46/00 (2022.01)
B01D 46/24 (2006.01)
B01D 46/64 (2022.01)

(52) U.S. Cl.
CPC ..... B01D 46/0005 (2013.01); B01D 46/2414 (2013.01); B01D 46/64 (2022.01); *B01D 2265/028* (2013.01); *B01D 2265/04* (2013.01); *B01D 2265/06* (2013.01)

(58) Field of Classification Search
CPC ........... B01D 46/0005; B01D 46/0002; B01D 46/4236; B01D 46/64; B01D 46/2414; B01D 2265/04; B01D 2265/06; B01D 2265/026; B01D 2265/028
See application file for complete search history.

(56) References Cited

U.S. PATENT DOCUMENTS

| 3,672,130 A | 6/1972 | Sullivan et al. |
| 4,211,543 A | 7/1980 | Tokar et al. |
| 4,222,755 A | 9/1980 | Grotto |
| 4,758,256 A | 7/1988 | Machado |
| 5,064,458 A | 11/1991 | Machado |

(Continued)

FOREIGN PATENT DOCUMENTS

| CN | 207892739 U | 9/2018 |
| DE | 19727369 A1 | 1/1999 |

(Continued)

*Primary Examiner* — Robert Clemente

(57) ABSTRACT

A secondary element for a filter system has first and second ends oppositely positioned to each other in longitudinal direction. The first end is closed by a closed end disk. The closed end disk has a first connection device for interacting with a complementary second connection device of a central tube of the filter system and for fixing the secondary element on the central tube. The first connection device has lock elements with radially inwardly oriented lock hooks distributed circumferentially on the closed end disk. A filter medium surrounds the lock elements. The lock elements include two directly neighboring lock elements having a distance relative to each other along the circumference of the closed end disk that is larger than a circumferential measurement of a radially outwardly oriented deflection element arranged at a collar of the central tube. A filter system with such a secondary element is provided.

20 Claims, 10 Drawing Sheets

(56) References Cited

U.S. PATENT DOCUMENTS

| 5,071,456 | A | 12/1991 | Binder et al. |
| 5,112,372 | A | 5/1992 | Boeckermann et al. |
| 5,730,769 | A * | 3/1998 | Dungs .................. F02M 35/024 55/482 |
| 5,893,937 | A * | 4/1999 | Moessinger ....... B01D 46/4272 55/505 |
| 6,419,718 | B1 | 7/2002 | Klug et al. |
| 6,863,758 | B1 | 3/2005 | Altmeyer et al. |
| 8,157,296 | B2 | 4/2012 | Ullrich et al. |
| 10,307,704 | B2 | 6/2019 | Scott et al. |
| 11,192,053 | B2 | 12/2021 | Campbell et al. |
| 11,192,057 | B2 | 12/2021 | Neef et al. |
| 2002/0040569 | A1 | 4/2002 | Reinhold |
| 2004/0031748 | A1 | 2/2004 | Kochert et al. |
| 2004/0050772 | A1 | 3/2004 | Winter et al. |
| 2004/0134171 | A1 | 7/2004 | Scott et al. |
| 2005/0081497 | A1* | 4/2005 | Connor .............. B01D 46/0005 55/493 |
| 2008/0190082 | A1* | 8/2008 | Scott .................. F02M 35/0201 55/520 |
| 2009/0049814 | A1 | 2/2009 | Baseotto et al. |
| 2009/0100813 | A1 | 4/2009 | Iddings et al. |
| 2010/0146917 | A1 | 6/2010 | Coulonvaux et al. |
| 2011/0000458 | A1 | 1/2011 | Muenkel |
| 2011/0247582 | A1 | 10/2011 | Blossey et al. |
| 2012/0067017 | A1 | 3/2012 | Baseotto et al. |
| 2013/0086877 | A1* | 4/2013 | Kori .................. B01D 46/2414 55/482 |
| 2013/0263744 | A1 | 10/2013 | Osendorf et al. |
| 2014/0102060 | A1 | 4/2014 | Kato et al. |
| 2014/0102304 | A1 | 4/2014 | Bouhanna |
| 2014/0174296 | A1 | 6/2014 | Schultz et al. |
| 2014/0230387 | A1 | 8/2014 | Kawabe et al. |
| 2014/0298612 | A1 | 10/2014 | Williams et al. |
| 2014/0325945 | A1 | 11/2014 | Coulonvaux et al. |
| 2017/0173512 | A1 | 6/2017 | Van Den Bossche et al. |
| 2018/0161707 | A1 | 6/2018 | Roesgen et al. |
| 2022/0126232 | A1 | 4/2022 | Ribeiro et al. |
| 2022/0145836 | A1 | 5/2022 | Ribeiro et al. |

FOREIGN PATENT DOCUMENTS

| DE | 10020538 | A1 | 10/2001 |
| DE | 10110029 | A1 | 9/2002 |
| DE | 102019210078 | A1 | 1/2021 |
| DE | 102020201990 | A1 | 8/2021 |
| EP | 0300182 | A1 | 1/1989 |
| EP | 1101928 | A1 | 5/2001 |
| EP | 1297880 | A2 | 4/2003 |
| EP | 3711841 | A1 | 9/2020 |
| GB | 1315163 | A | 4/1973 |
| JP | H051850 | U | 1/1993 |
| JP | H0730358 | U | 6/1995 |
| WO | 9718883 | A1 | 5/1997 |
| WO | 9937906 | A1 | 7/1999 |
| WO | 9946401 | A2 | 9/1999 |
| WO | 9946501 | A1 | 9/1999 |
| WO | 11048197 | A1 | 4/2011 |

* cited by examiner

SECONDARY ELEMENT AND FILTER SYSTEM

BACKGROUND OF THE INVENTION

The invention concerns a secondary element for use in a filter system and a filter system for filtering a fluid with a secondary element, in particular of an air guiding system of an internal combustion engine, in particular of a motor vehicle.

It is known to use air filters in order to filter combustion intake air for internal combustion engines in motor vehicles, e.g., passenger cars, commercial vehicles, working machines, agricultural vehicles, but also in stationary generators and the like. Such air filters comprise in general a housing, an air inlet, and an air outlet, wherein a removable and exchangeable main filter element is arranged in the housing. Often, the housing comprises a service or access cover for accessing in case of maintenance the filter element received in the interior. For this purpose, the filter element can be demounted and either replaced with a brand-new filter element, refurbished and inserted again, or exchanged for a pre-used but refurbished filter element.

Usually, the filter elements of air filters are exchanged after a defined operating period. Depending on the dust accumulation, the service life of an air filter can amount to a few days, for example, when used in construction machines, up to several months in environments less laden with dust.

In particular in case of a frequent exchange of filter elements, a reliable and safe sealing action of the filter element in a housing is important. The sealing action is to be embodied so as to be temperature-resistant and vibration-proof. Even in facilities or devices which are exposed to strong vibrations or shocks, the sealing action of the filter element must be ensured. However, at the same time, the filter element itself should comprise no metallic elements, if possible, so that it can be disposed of thermally without problem.

For protecting the clean side of an air guiding system of an internal combustion engine from ingress of dirt particles when exchanging a filter element, in air filter systems often a so-called secondary element is present which remains in the filter system upon exchange. The secondary element usually is seated at the clean side of the filter element, for example, in the interior of a round filter element and is connected to the housing of the filter system. The secondary element comprises itself also a filter medium which keeps away from the filter outlet residual dirt particles in the air flow. The secondary element itself can also be exchangeable because it may also be laden with dust particles, however at much larger temporal intervals than the actual filter element.

From U.S. Pat. No. 8,480,778 B2 an air filter system is known in which a secondary element is present which is comprised of a filter medium in hollow cylindrical arrangement which is closed by a cap at one end and is open at the other end. With the open end, it can be pushed over a central tube, which is arranged in the interior of the filter element and is connected to the filter housing, and protect in this way the outlet of the filter system against ingress of dirt particles. The actual filter element is then mounted over the secondary element attached to the central tube and rests on the free end of the central tube and thus on the cap of the secondary element.

DE 2948781 T5 discloses a cone-shaped securing element on a metallic carrier which is arranged in a filter element.

WO 201 6/1 69 838 A1 discloses a cone-shaped secondary element on a carrier, wherein the end disk of the secondary element comprises an inwardly oriented axial infolding with radially outwardly oriented lock hooks which can be hooked in a shape-complementary infolding of the carrier.

SUMMARY OF THE INVENTION

It is an object of the invention to provide a secondary element for a filter system which ensures a reliable sealing action of the clean side of an air guiding system, in particular when exchanging the filter element in case of maintenance, while providing a simple and safe mountability.

A further object is providing a filter system for receiving such an exchangeable secondary element which ensures a reliable sealing action of the clean side of an air guiding system, in particular upon exchange of the filter element in case of maintenance.

The aforementioned object is solved according to an aspect of the invention by a secondary element for use in a filter system with a longitudinal direction and two ends oppositely positioned relative to each other along the longitudinal direction, comprising a filter medium arranged about the longitudinal direction, wherein one of the ends is open and the oppositely positioned end is seal-tightly closed by a closed end disk, wherein the end disk comprises a first connection device which upon intended mounting is provided for interaction with a complementary second connection device of a central tube of a filter system in order to fix the secondary element on the central tube, wherein the first connection device comprises lock elements with radially inwardly oriented lock hooks which are arranged distributed on an outer circumference of the end disk, wherein the filter medium surrounds the lock elements. The distance of two directly neighboring lock elements along the outer circumference of the end disk is larger than a measurement, in circumferential direction, of a deflection element arranged at a collar of the central tube and arranged at the collar of the central tube so as to be oriented radially outwardly.

The further object is solved by a filter system for filtering a fluid, comprising a housing, an inlet socket arranged at the housing for supply of a fluid to be filtered, in particular air, an outlet socket arranged at the housing for discharging the filtered fluid, in particular an outlet socket centrally arranged in a longitudinal direction, at least one filter element arranged between inlet socket and outlet socket, a central tube arranged in the interior of the housing along the longitudinal direction for receiving a filter element, wherein the central tube is provided as a carrier of a secondary element, which is arranged in the interior of the filter element, wherein the secondary element at one end comprises a closed end disk, wherein the secondary element and the central tube each comprise connection devices complementary to each other, with which they are connectable to each other at one of their end faces, wherein the first connection device of the secondary element comprises lock elements which are arranged distributed about an outer circumference of the end disk and comprise radially inwardly oriented lock hooks, wherein the second connection device of the central tube comprises a circumferentially extending collar, wherein, in an intended mounted state, the lock elements are locked at the collar of the central tube by means of the lock hooks and fix the secondary element in the longitudinal direction of the filter system. The central tube comprises at least one deflection element arranged at the collar of the central tube so as to be oriented radially outwardly. The distance of two directly neighboring lock elements along the outer circumference of the end disk is larger than a measurement, in circumferential direction, of the deflection element arranged at the collar of the central tube.

Beneficial embodiments and advantages of the invention result from the additional claims, the description, and the drawing.

According to an aspect of the invention, a secondary element for use in a filter system is proposed, with a longitudinal direction and two ends oppositely positioned relative to each other along the longitudinal direction, comprising a filter medium arranged about the longitudinal direction, wherein one of the ends is open and the oppositely positioned end is seal-tightly closed by a closed end disk. The end disk comprises a first connection device which upon intended mounting is provided for interaction with a complementary second connection device of a central tube of a filter system in order to fix the secondary element on the central tube. The first connection device comprises lock elements with radially inwardly oriented lock hooks which are arranged distributed about an outer circumference of the end disk, wherein the filter medium surrounds the lock elements. The distance of two directly neighboring lock elements along the outer circumference of the end disk is larger than a measurement, in circumferential direction, of a deflection element arranged at a collar of the central tube and arranged at the collar of the central tube so as to be oriented radially outwardly. In this way, it can be prevented that two lock elements can hook at the deflection element and that the secondary element cannot be completely pushed on.

A typical round air filter, for example, for heavy trucks, comprises a primary filter element, for example, of folded cellulose material, and a secondary filter element. This so-called secondary element serves to prevent upon exchange of the filter element that raw fluid can pass to the clean fluid side and thus to the clean fluid outlet. The secondary element, for example, can be designed as a so-called sock element which is sealed by a seal-tight plastic lid at the end which is not sealed relative to the filter housing.

The proposed secondary element whose diameter tapers from the open end toward the closed end is comprised of a conical filter medium of a round shape, connected by welding at the longitudinal ends, and of a plastic end disk which can be connected, for example, by welding to the filter medium. The filter medium of the secondary element can be formed, for example, of a nonwoven or of paper or of cellulose or of a mixed fiber of plastic material and cellulose.

The end disk comprises lock elements in order to connect and to fix the secondary element to the central tube integrated in the housing. In this context, the lock elements engage the collar of a central tube of the filter system from a radial outer side. The lock elements in an intended mounted state are secured and/or locked by the lock hooks at the collar of the central tube and fix the secondary element in a longitudinal direction of the filter system. The lock hooks in this context are oriented radially inwardly and lock at the outer circumference of the collar.

This connection can be released by applying a sufficient force in order to demount the secondary element from the central tube.

According to a beneficial embodiment of the secondary element, the end disk can have a bulge which projects outwardly in the longitudinal direction. The end disk of the secondary element can comprise an outwardly oriented recess oriented toward the bottom region of the primary filter element of the filter system which provides space at the inner clean side. This space, for example, can be utilized for the integration of an acoustic resonator. In addition, the bulge can serve as positioning aid and/or mounting aid when mounting the secondary element. In addition, the bulge due to embossing can serve for reinforcing the end disk.

The bulge, for example, can be designed in the form of a truncated cone with the tip of the funnel in axial direction toward the exterior. In this context, the bulge can be embodied in particular to conform in shape to a truncated cone-shaped bulge of the central tube so that the bulge of the secondary element can rest against the bulge of the central tube when the secondary element is mounted on the central tube.

According to a beneficial embodiment of the secondary element, the lock elements can be distributed so as to be grouped on the outer circumference of the end disk. In this context, a respective lock element can comprise in particular in relation to a directly neighboring lock element on one side along the circumference a smaller distance than to a neighboring lock element on the other side along the circumference. In this way, for example, groups of two lock elements can be arranged distributed about the circumference of the end disk. Advantageously, the required mounting forces and/or demounting forces for the secondary element can be reduced in this way. Alternatively, the lock elements can also be arranged uniformly distributed.

The spacing of two directly neighboring lock elements along the outer circumference of the end disk is larger than a measurement, in circumferential direction, of a deflection element arranged at the collar of the central tube. In this context, the deflection element is designed to prevent that the secondary element can be positioned on the central tube in a rotary position in which a lock element collides with a reinforcement rib of the central tube.

According to a beneficial embodiment of the secondary element, the end disk can be fixedly connected to the filter medium. In particular, the end disk can be fused to or glued to or molded on the filter medium. In this way, a seal-tight and permanent connection between the end disk and the jacket of filter medium of the secondary element can be achieved.

According to a further aspect of the invention, a filter system for filtering a fluid is proposed, comprising a housing, an inlet socket arranged at the housing for supply of a fluid to be filtered, in particular air, an outlet socket arranged at the housing for discharging the filtered fluid, in particular an outlet socket centrally arranged in a longitudinal direction, at least one filter element which is arranged between inlet socket and outlet socket, and a central tube, arranged in the interior of the housing along the longitudinal direction, for receiving a filter element. The central tube is designed as carrier of a secondary element which is arranged in the interior of the filter element. The secondary element comprises a closed end disk at one end. The secondary element and the central tube each comprise connection devices complementary to each other with which they are connectable at one of their end faces. In this context, the first connection device of the secondary element comprises lock elements which are arranged distributed on an outer circumference of the end disk and comprise radially inwardly oriented lock hooks. The second connection device of the central tube comprises a circumferentially extending collar. In this context, the lock elements are locked in an intended mounted state by means of the lock hooks at the collar of the central tube and fix the secondary element in the longitudinal direction of the filter system. The central tube comprises at least one deflection element arranged at the collar of the central tube so as to be oriented radially outwardly. The distance of two directly neighboring lock elements along the outer circumference of the end disk is larger than a measurement, in circumferential direction, of a deflection element arranged at the collar of the central tube.

In this way, it can be prevented that two lock elements can hook at the deflection element and that the secondary element cannot be completely pushed on.

The proposed filter system, for example, a typical round air filter for heavy trucks, comprises a primary filter element, for example, of folded cellulose material, and a secondary filter element. This so-called secondary element serves to prevent, upon exchange of the filter element, that raw fluid can pass to the clean fluid side and thus to the clean fluid outlet. The secondary element can be designed, for example, as a so-called sock element which at the end which is not sealed in relation to the filter housing is sealed by a seal-tight plastic cover.

The filter housing comprises a housing-fixed central tube on which the secondary element is arranged. The central tube serves furthermore for receiving the primary filter element on top of the secondary element. The central tube is conically configured and tapers in diameter away from the outlet socket along the longitudinal axis.

The secondary element whose diameter tapers from the open end toward the closed end is comprised of a conical filter medium of a round shape, which is connected at the longitudinal ends by welding, and of a plastic end disk which can be connected, for example, by welding to the filter medium. The filter medium of the secondary element can be comprised, for example, of a nonwoven or of paper or of cellulose or of a mixed fiber of plastic material and cellulose.

The end disk comprises lock elements in order to connect and to fix the secondary element to the central tube integrated in the housing. In this context, the lock elements engage the collar of the central tube of the filter system from a radial outer side. In an intended mounted state, the lock elements are secured and/or locked with the lock hooks at the collar of the central tube and fix the secondary element in a longitudinal direction of the filter system. In this context, the lock hooks are radially inwardly oriented and lock at the outer circumference of the collar.

This connection can be released by applying a sufficient force in order to demount the secondary element from the central tube.

According to a beneficial embodiment of the filter system, the connection devices which are complementary to each other can be designed so as to be detachable without being destroyed. In this way, a separate exchange of the secondary element can be performed in a simple manner as needed when the filter performance is exhausted.

According to a beneficial embodiment of the filter system, the secondary element can project axially past the central tube at the closed end. In this way, the secondary element can be pushed onto the central tube and seals the outlet socket reliably against soiling upon exchange of the filter element.

According to a beneficial embodiment of the filter system, the central tube, at its end at which the second connection device is arranged, can have a bulge, in particular a flexible rib structure, which can be embodied to conform in shape to the bulge of the secondary element. At the housing-fixed central tube, a bulge, in particular in the form of a flexible rib structure, can thus be implemented in this way which projects into the outwardly oriented bulge of the end disk of the secondary element and enables a locked connection under minimal pretension between central tube and secondary element. This can prevent noise generation in case of vibrations due to axial tolerances of end disk and housing-fixed central tube.

The bulge can expediently serve as positioning aid and/or mounting aid upon mounting of the secondary element.

According to a beneficial embodiment of the filter system, the bulge of the secondary element can be designed with a truncated cone shape and in particular can be designed so as to conform in shape to a truncated cone-shaped bulge of the central tube. The bulge can be, for example, of a truncated cone shape with the tip of the funnel in axial direction toward the exterior. Since in this context the bulge in particular is designed to conform in shape to a bulge of the central tube, the bulge of the secondary element can contact the bulge of the central tube when the secondary element is mounted on the central tube. In alternative embodiments, the bulge can also have other shapes, for example, a semispherical bulge.

According to a beneficial embodiment of the filter system, the lock elements can be distributed so as to be grouped on the outer circumference of the end disk. A respective lock element can comprise in particular in relation to a directly neighboring lock element on one side along the circumference a smaller distance than to a lock element neighboring at the other side along the circumference. In this way, for example, groups of two lock elements can be arranged distributed about the circumference of the end disk. Advantageously, in this way, the required mounting forces and/or demounting forces can be reduced. Alternatively, the lock elements can also be arranged uniformly distributed.

The deflection element can be arranged at a circumferential position of a reinforcement rib of the central tube. The deflection element is designed to prevent that the secondary element is positioned in a rotary position on the central tube in which a lock element collides with a reinforcement rib of the central tube which affects negatively the holding forces of the snap hooks.

Expediently, the deflection element can have for this purpose a control surface which guides the lock element to the side upon pushing on the secondary element so that the lock element can lock at the collar adjacent to the reinforcement rib. In this manner, the secondary element is rotated about the longitudinal axis to the side when the lock element impinges on the deflection element. For this function, a single deflection element is sufficient on the circumference of the collar of the central tube. Despite of this, an oppositely positioned deflection element is advantageous because tilting of the cover can be prevented in this way.

According to a beneficial embodiment of the filter system, the collar of the central tube can comprise support elements pointing in longitudinal direction which, in the intended mounted state of the secondary element, contact an inwardly oriented counter holding surface of the end disk. In particular, in this context, the secondary element can be clamped in the intended mounted state by means of the support elements in longitudinal direction. In this way, positioning of the secondary element on the central tube can be facilitated. In addition, the support elements advantageously can serve for producing a pretension between secondary element and central tube. The support elements can be designed advantageously as an elastic element which can be compressed in order to build up a pretension. As an alternative, the support element however can be a solid element of plastic material. For example, the support element can be designed as a 2K plastic material component with a rubber buffer.

According to a beneficial embodiment of the filter system, the secondary element can be secured at the central tube under pretension. In particular, in this context a pretension element can be arranged between secondary element and central tube. In particular, the pretension element can be arranged between the end disk of the secondary element and the collar of the central tube. Expediently, the pretension element which, for example, can be designed as an elastic ring can be connected to the collar of the central tube, for example, glued. The pretension element advantageously can be designed as an elastic element which can be compressed in order to build up a pretension. As an alternative, the pretension element however can also be a solid element of plastic material. For example, the pretension element can be designed as a 2K plastic material component with a rubber buffer. In this way, vibrations which are present in driving operation of a vehicle can be advantageously kept away from the secondary element so that the service life of the secondary element can be prolonged.

According to a beneficial embodiment of the filter system, the filter element can radially inwardly seal at its end face at the outlet socket side. In this way, the raw fluid region can be separated in a reliable manner from the clean fluid region.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
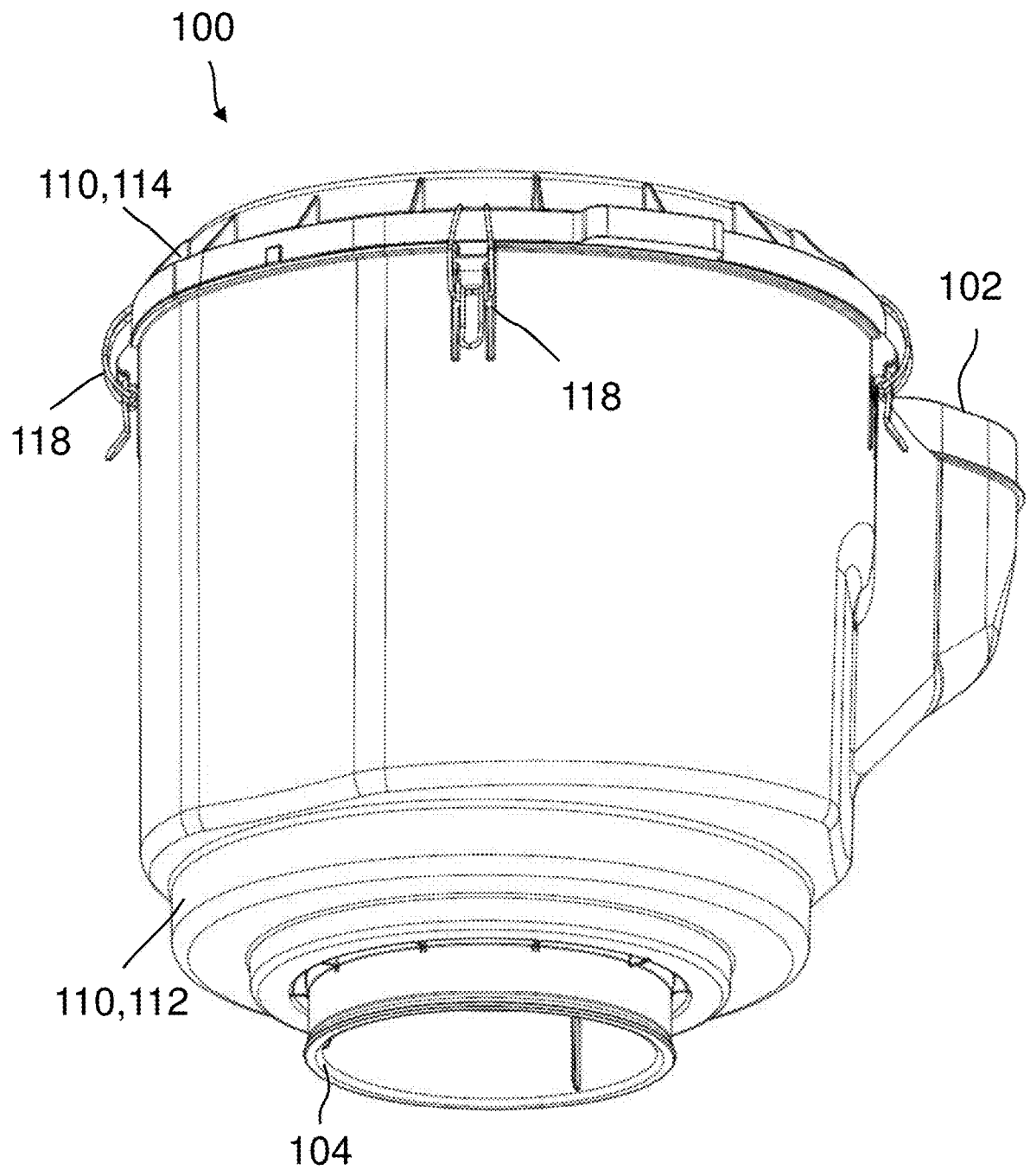
FIG. 1 shows an isometric illustration of a filter system for filtering a fluid according to an embodiment of the invention.

In the Figures, same or same-type components are identified with same reference characters. The Figures show only examples and are not to be understood as limiting.

Directional terminology used in the following with terms such as "left", "right", "top", "bottom", "in front of", "behind", "thereafter", and the like serve only for better understanding of the Figures and is not to be understood in any case as a limitation of the generality. The illustrated components and elements, their design and use can vary in the context of considerations of a person of skill in the art and be adapted to the respective applications.

Figure 2:
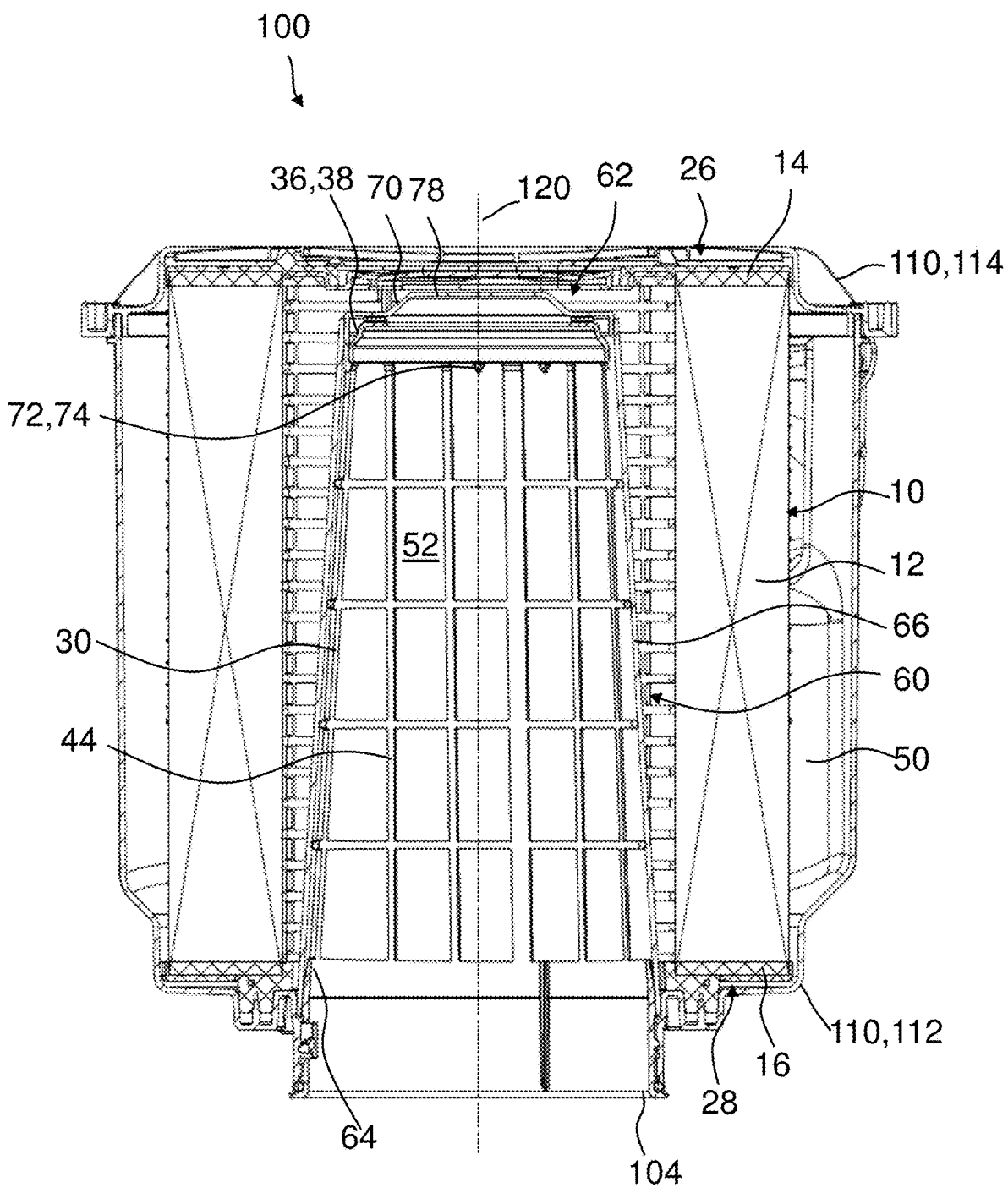
FIG. 2 shows a longitudinal section of the filter system according to FIG. 1.

FIG. 1 shows an isometric illustration of a filter system 100 for filtering a fluid according to an embodiment of the invention, while in FIG. 2 a longitudinal section of the filter system 100 is illustrated.

The filter system 100 for filtering a fluid, in particular of an air guiding system of an internal combustion engine, in particular of a motor vehicle, comprises a filter housing 110 with a housing bottom part 112 and a housing top part 114 which extend along a longitudinal direction 120. The two housing parts 112, 114 are connected, for example, clipped on, by connecting elements 118 so that the filter housing 110 can be easily opened, the housing top part 114 taken off, and the filter element 10 removed from the housing bottom part 112 for changing the filter element 10.

At the housing 110, an inlet socket 102 for supply of a fluid to be filtered, in particular air, and an outlet socket 104 for discharging the filtered fluid is arranged. The outlet socket 104 is centrally arranged in this context in the longitudinal direction 120 of the filter system 100.

The filter system 100 comprises furthermore a filter element 10 which separates fluid-tightly a clean fluid side 52 and a raw fluid side 50. In this context, the filter element 10 comprises a hollow cylinder-type filter bellows 12 arranged about the longitudinal direction 120 which comprises a closed circumferential wall which extends axially along the longitudinal direction 120 and surrounds an interior of the filter bellows 12. The filter element 10 comprises at a first end face 26 a first end disk 14 which is oppositely arranged to a second end disk 16 at a second end face 28 which comprises a fluid passage for the filtered fluid.

In the housing 110, the filter element 10 is arranged between inlet socket 102 and outlet socket 104. The filter element 10 seals radially inwardly at its end face 28 at the outlet socket side so that in a reliable manner the raw fluid region is separated from the clean fluid region.

Furthermore, a central tube 30 for receiving the filter element 10 is arranged in the interior of the housing 110 along the longitudinal direction 120. The central tube 30 is provided furthermore as carrier of a secondary element 60 which is arranged in the interior of the filter element 10.

The secondary element 60 comprises a closed end disk 70 at an end 62. The secondary element 60 projects axially past the central tube 30 at the closed end 62.

Secondary element 60 and central tube 30 comprise each connection devices 72, 36 complementary to each other with which they are connected to each other at one of their ends 62, 32.

In this context, the first connection device 72 of the secondary element 60 comprises lock elements 74 which are arranged distributed on an outer circumference of the end disk 70 and comprise radially inwardly oriented lock hooks 76. The second connection device 36 of the central tube 30 comprises a circumferentially extending collar 38. In this context, the lock elements 74 are locked in an intended mounted state by means of the lock hooks 76 at the collar 38 of the central tube 30 and fix in this way the secondary element 60 in the longitudinal direction 120 of the filter system 100.

The connection devices 72, 36 which are complementary to each other are configured to be detached without being destroyed so that a separate exchange of the secondary element 60 can be performed in a simple manner as needed upon exhaustion of the filter performance.

Figure 3:
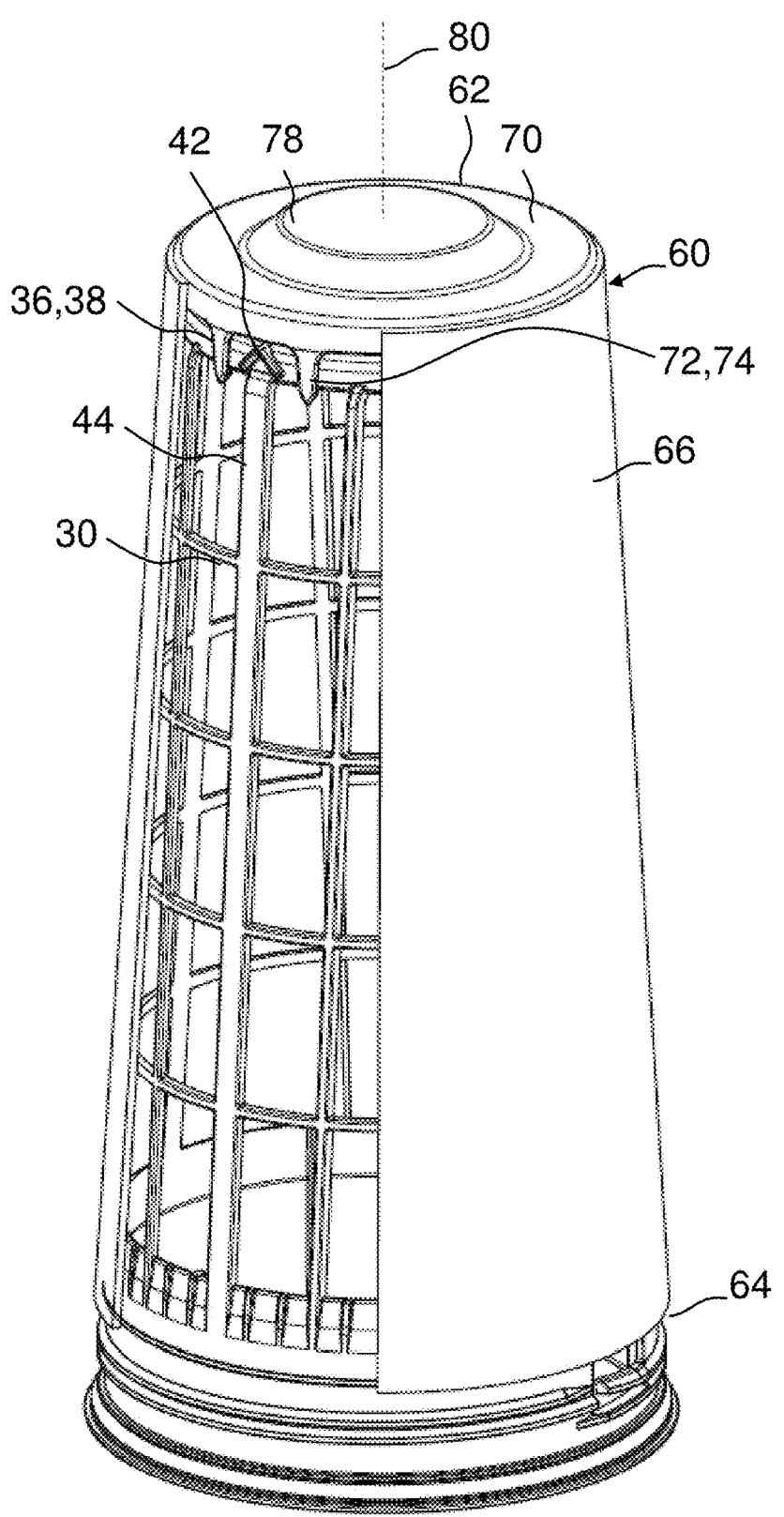
FIG. 3 shows a partially cutaway isometric illustration of a central tube with secondary element mounted thereon according to an embodiment of the invention.
Figure 4:
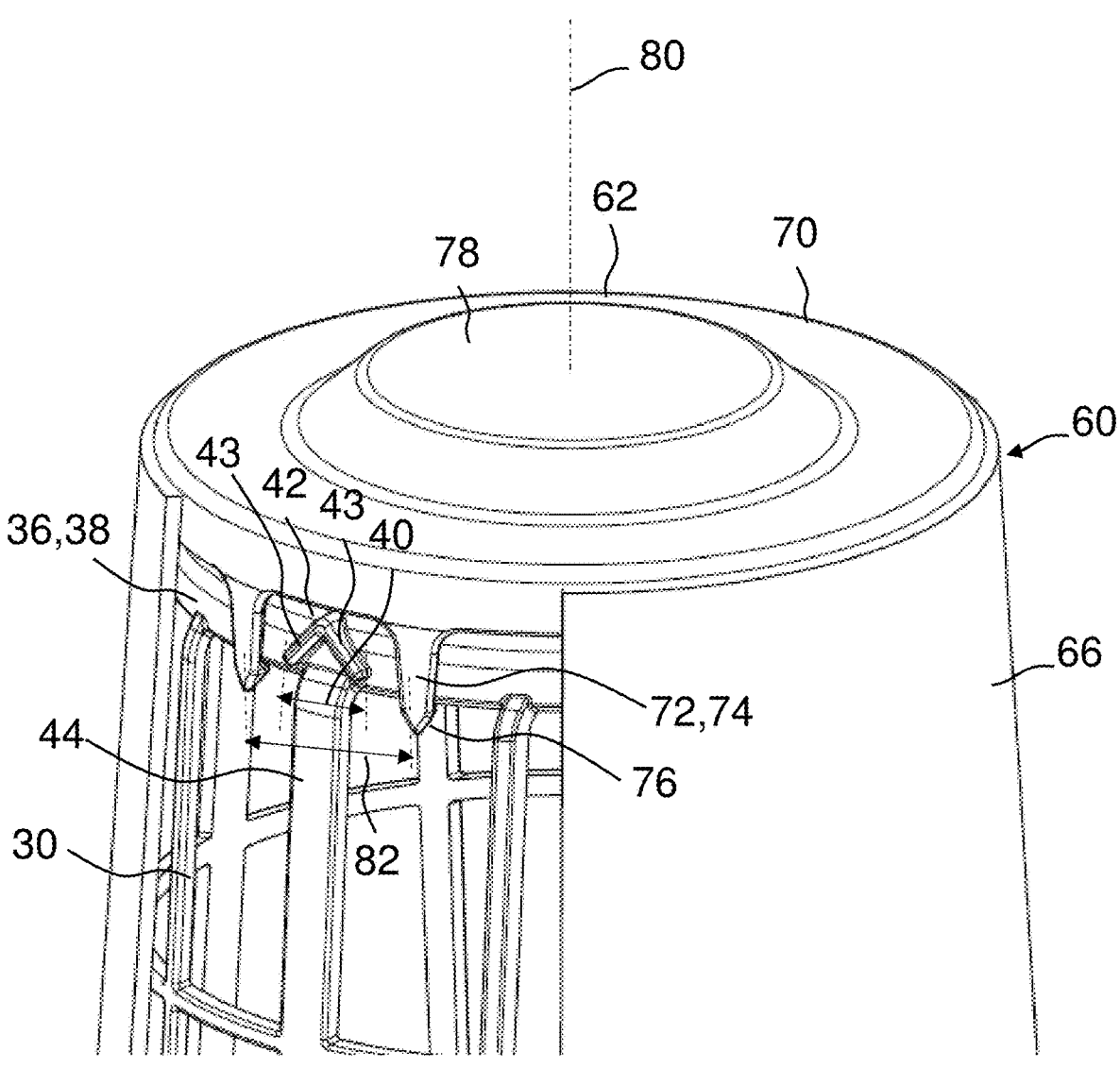
FIG. 4 shows an enlarged detail of the region of the end disk of the secondary element according to FIG. 3.

FIG. 3 shows a partially cutaway isometric illustration of the central tube 30 with secondary element 60 mounted thereon according to an embodiment of the invention. In FIG. 4, an enlarged detail of the region of the end disk 70 of the secondary element is illustrated.

The secondary element 60 with a longitudinal direction 80 and two ends 62, 64 positioned opposite each other along the longitudinal direction 80 comprises a filter medium 66 arranged about the longitudinal direction 80. One of the ends 64, namely the end 64 which is oriented toward the outlet socket 104, is open while the oppositely positioned end 62 is seal-tightly closed with a closed end disk 70. The diameter of the secondary element 60 tapers from the open end 64 toward the closed end 62. The end disk 70 is fixedly connected to the filter medium 66, in particular welded or glued or molded on.

The filter medium 66 can be formed, for example, of a nonwoven or of paper or of cellulose or of a mixed fiber of plastic material and cellulose.

The end disk 70 comprises the first connection device 72 which upon intended mounting is provided for interaction with the second complementary connection device 36 of the central tube 30 of the filter system 100 in order to fix the secondary element 60 on the central tube 30.

The first connection device 72 comprises lock elements 74 with radially inwardly oriented lock hooks 76 which are arranged distributed on the outer circumference of the end disk 70. In this context, the filter medium 66 surrounds the lock elements 74.

For reasons of simplification, only one of the lock elements 74 is provided with reference character.

The lock elements 74 in an intended mounted state of the secondary element 60 are secured/locked with the lock hooks 76 at the collar 38 of the central tube 30 and fix in this way the secondary element 60 in the longitudinal direction 120 of the filter system 100.

As can be seen in FIG. 4, the central tube 30 comprises at least one deflection element 42 arranged facing radially outwardly at the collar 38 of the central tube 30 and which is arranged at a circumferential position about the longitudinal axis 80 of a reinforcement rib 44 of the central tube 30. The deflection element 42 is intended to prevent that lock elements 74 impact on reinforcement ribs 44 upon pushing the secondary element 60 onto the central tube 30. For this purpose, the deflection element 42 comprises control surfaces 43 which move the lock element 74 and thus the entire secondary element 60 about the longitudinal axis 80 to the side so that the lock element 74 can lock safely at the collar 38.

The distance 82 of two directly neighboring lock elements 74 along the outer circumference of the end disk 70 is larger than a measurement 40, in circumferential direction of the collar 38, of a deflection element 42 which is arranged at the collar 38 of the central tube 30. In this way, it can be prevented that two lock elements 74 can get hooked at the deflection element 42 and that the secondary element 60 cannot be completely pushed on.

Figures 5, 6, 7:
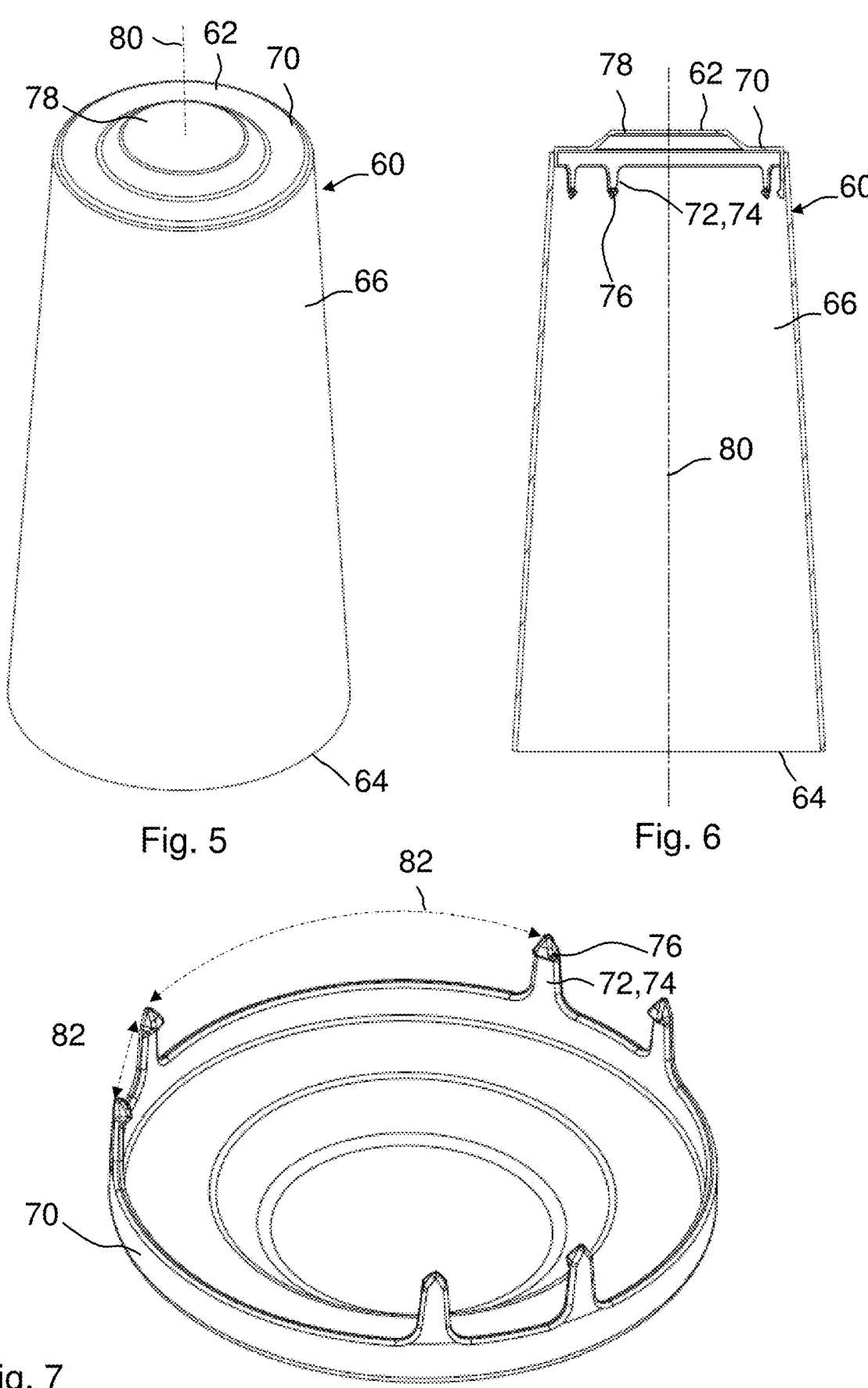
FIG. 5 shows an isometric illustration of a secondary element according to an embodiment of the invention.
FIG. 6 shows a longitudinal section of the secondary element according to FIG. 5.
FIG. 7 shows an isometric illustration of the end disk of the secondary element according to FIG. 5 in a view from the interior.

FIG. 5 shows an isometric illustration of the secondary element 60 while in FIG. 6 a longitudinal section through the secondary element and in FIG. 7 an isometric illustration of the end disk 70 of the secondary element 60 in a view from the interior is illustrated. The conically tapering shape of the jacket of the secondary element 60 formed by the filter medium 66 as well as the inwardly oriented lock elements 74 which are projecting away from the end disk 70 in longitudinal direction 80 can be seen clearly.

The end disk 70 comprises furthermore a bulge 78 which projects outwardly in the longitudinal direction 80. The bulge 78 can serve as a positioning aid and/or mounting aid during mounting of the secondary element 60. For this purpose, the central tube 30 can comprise at its end 32 at which the second connection device 36 is arranged a bulge 34 which is not visible in this illustration and which is embodied to conform in shape to the bulge 78 of the secondary element 60. The bulge 34 can be formed in particular as a flexible rib structure which projects into the outwardly oriented recess 78 of the end disk 70 of the secondary element 60 and enables a locked connection under minimal pretension between central tube 30 and secondary element 60.

In particular, the bulge 78 can be of a truncated cone-shaped configuration and can be embodied to conform in shape to a truncated cone-shaped bulge 34 of the central tube 30. In an alternative embodiment, the bulge 78 can however also have other shapes, for example, a semi-spherically shaped bulge.

As can be seen in particular in FIG. 7, the lock elements 74 can be distributed so as to be grouped on the outer circumference of the end disk 70. In particular, in this way a respective lock element 74 can comprise relative to a directly neighboring lock element 74 on one side along the circumference a smaller distance 82 than to a neighboring lock element 74 on the other side along the circumference. In the illustrated embodiment, the lock elements 74 are arranged in groups of two.

Figure 8:
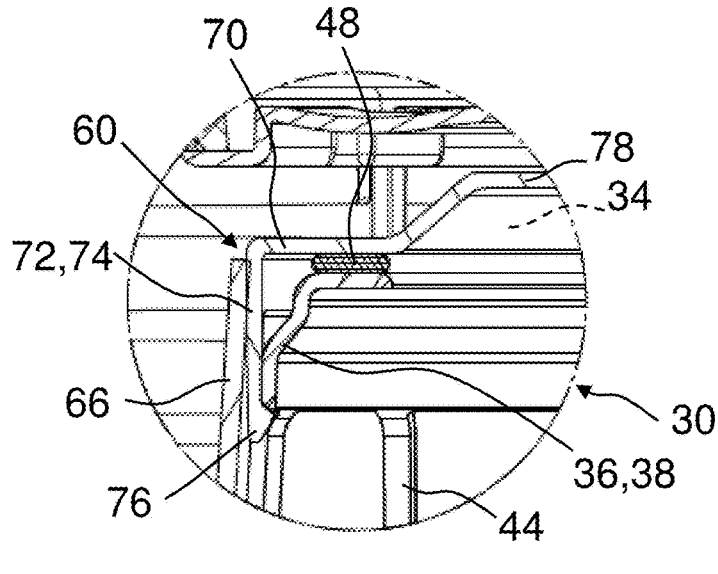
FIG. 8 shows an enlarged detail of a longitudinal section of the filter system according to FIG. 2 through secondary element and central tube in the region of the end disk of the secondary element and of the collar of the central tube.

FIG. 8 shows an enlarged detail of the longitudinal section of the filter system 100 according to FIG. 2 through secondary element 60 and central tube 30 in the region of the end disk 70 of the secondary element 60 and of the collar 38 of the central tube 30.

In FIG. 8, it can be seen how the end disk 70 of the secondary element 60 is supported at the collar 38 of the central tube 30, in particular how, at the outer circumference of the end disk 70, a lock element 74 engages with its radially inwardly projecting lock hook 76 below the collar 38 and the secondary element 60 locks at the collar 38 of the central tube 30 in this way.

The secondary element 60 is secured in this context at the central tube 30 with pretension in order to dampen the transmission of vibrations from the central tube 30 to the secondary element 60. In particular, as illustrated in the embodiment in FIG. 8, a pretension element 48 can be arranged for this purpose between secondary element 60 and central tube 30 and is arranged between the end disk 70 of the secondary element 60 and the collar 38 of the central tube 30.

Figure 9:
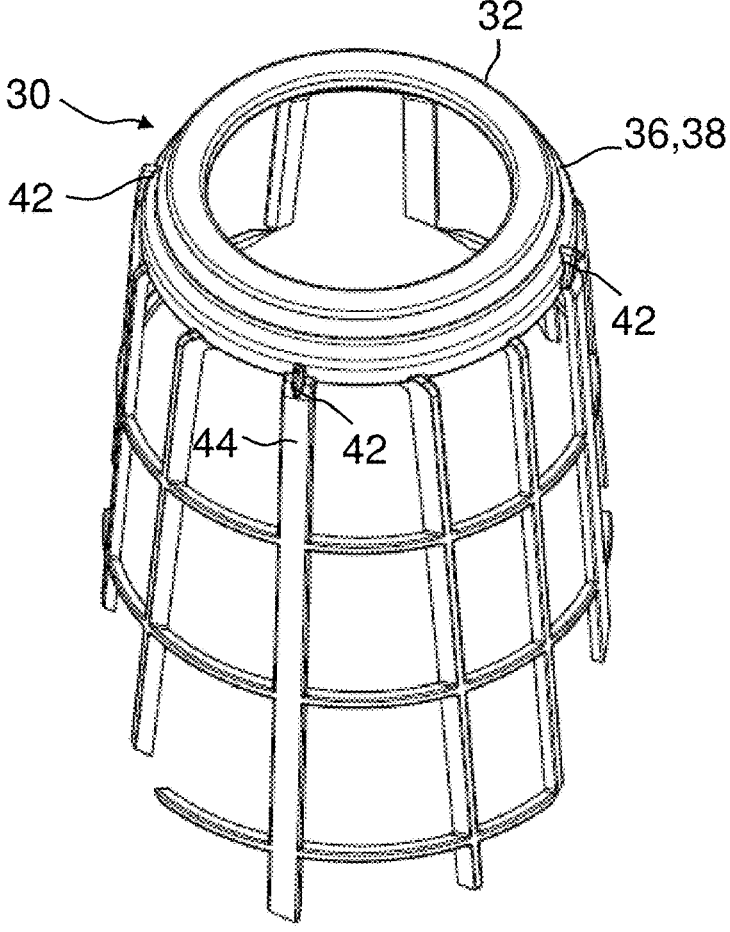
FIG. 9 shows an isometric illustration of the central tube of the filter system according to FIG. 2.

FIG. 9 shows an isometric illustration of the central tube 30 of the filter system 100. The central tube 30 is conically designed and tapers in diameter away from the outlet socket 104 along the longitudinal axis 120. Radially outwardly projecting deflection elements 42 can be seen at the collar 38 of the central tube 30.

Figure 10:
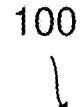
FIG. 10 shows a longitudinal section through a filter system for filtering a fluid according to a further embodiment of the invention with a secondary element.
Figure 11:
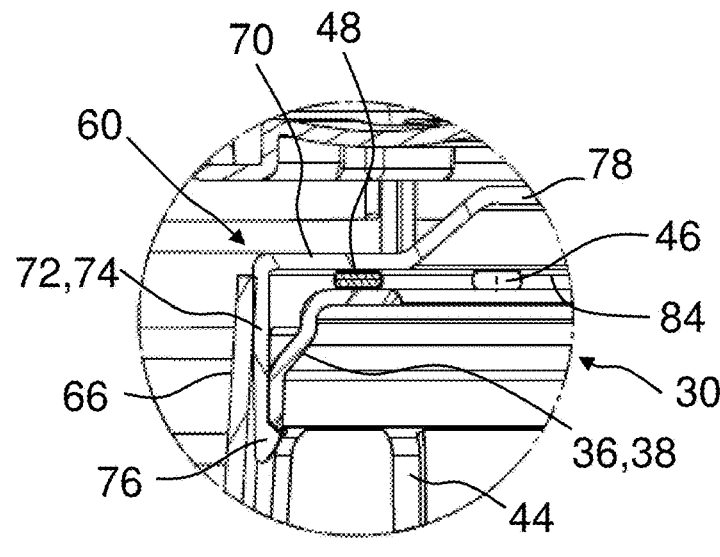
FIG. 11 shows an enlarged detail of a longitudinal section of the filter system according to FIG. 10 through secondary element and central tube in the region of the end disk of the secondary element and of the collar of the central tube.
Figure 12:
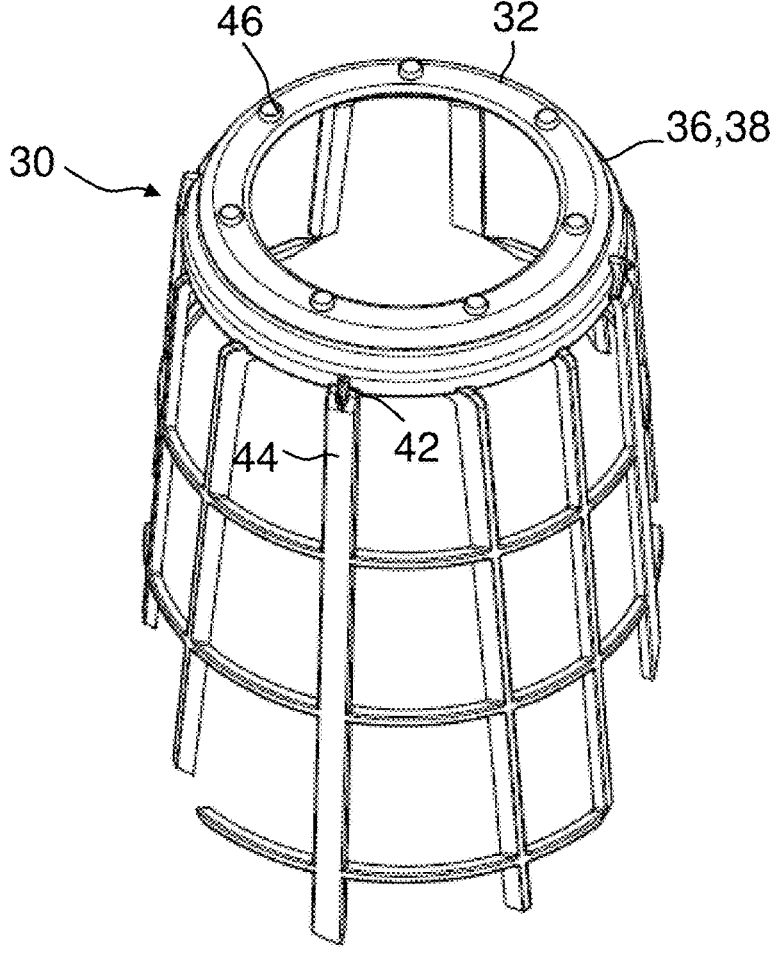
FIG. 12 shows an isometric illustration of the central tube of the filter system according to FIG. 10.

FIG. 10 shows a longitudinal section through a filter system 100 for filtering a fluid according to a further embodiment of the invention with a secondary element 60. In FIG. 11, an enlarged detail of the longitudinal section of the filter system 100 through secondary element 60 and central tube 30 in the region of the end disk 70 of the secondary element 60 and of the collar 38 of the central tube 30 is illustrated correspondingly. FIG. 12 shows an isometric illustration of the central tube 30 of the filter system 100 according to FIG. 10.

With respect to its important features, the filter system 100 is identical to the embodiment illustrated in FIGS. 1 to 9 so that only the differences will be explained.

In the embodiment illustrated in FIGS. 10 to 12, the collar 38 of the central tube 30 has support elements 46 oriented in longitudinal direction 120 which in the intended mounted state of the secondary element 30 contact an inwardly oriented counter holding surface 84 of the end disk 70. In particular, the secondary element 60 in the intended mounted state can be clamped in this context by means of the support elements 46 in longitudinal direction 120 because the support elements 46 are contacting the inner side of the secondary element 60 at the counter holding surface 84. The support elements 46 are formed in this embodiment as round knobs which are arranged at the end 32 of the central tube 30 on the collar 38.

Figure 13:
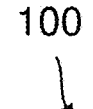
FIG. 13 shows a longitudinal section through a filter system for filtering a fluid according to a further embodiment of the invention with a secondary element.
Figure 14:
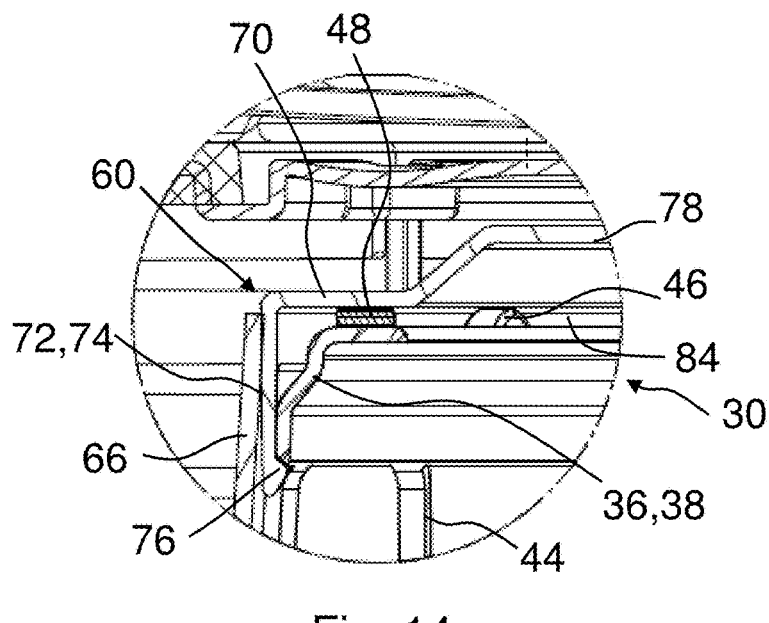
FIG. 14 shows an enlarged detail of a longitudinal section of the filter system according to FIG. 13 through secondary element and central tube in the region of the end disk of the secondary element and of the collar of the central tube.
Figure 15:
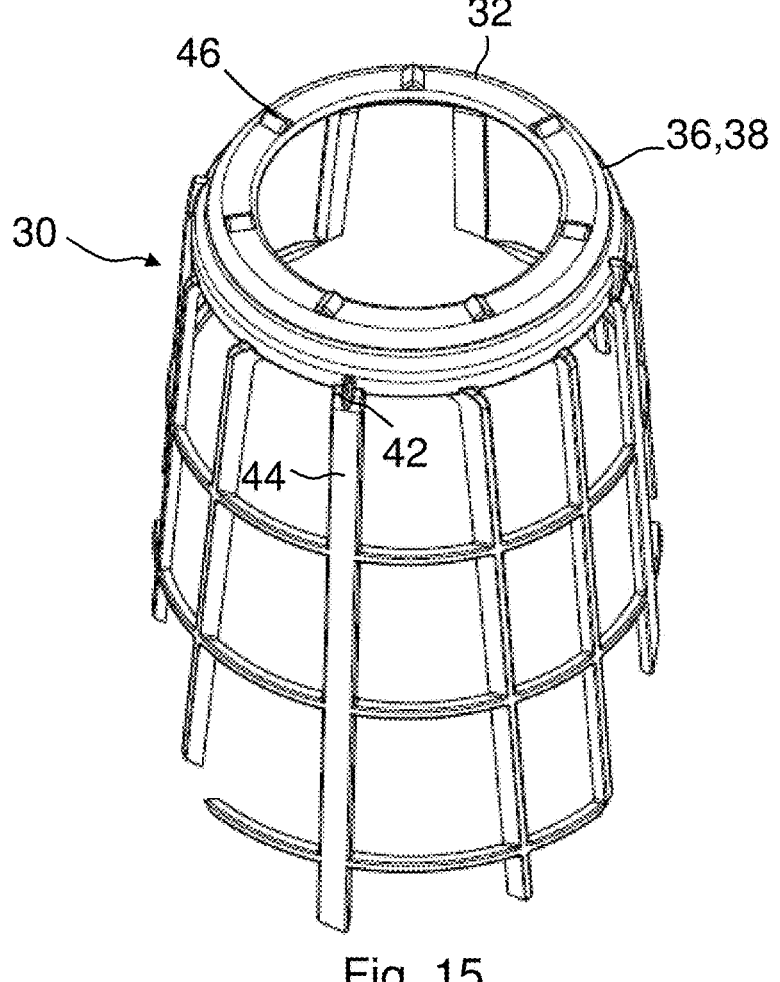
FIG. 15 shows an isometric illustration of the central tube of the filter system according to FIG. 13.

FIG. 13 shows a longitudinal section through a filter system 100 for filtering a fluid according to a further embodiment of the invention with a secondary element 60. In FIG. 14, an enlarged detail of the longitudinal section of the filter system 100 through the secondary element 60 and central tube 30 in the region of the end disk 70 of the secondary element 60 and of the collar 38 of the central tube 30 is illustrated correspondingly. FIG. 15 shows an isometric illustration of the central tube 30 of the filter system 100 according to FIG. 13.

In respect to important features, the filter system 100 is identical to the embodiment illustrated in FIGS. 10 to 12 so that only the differences will be explained.

In the embodiment illustrated in FIGS. 13 to 15, the collar 38 of the central tube 30 comprises support elements 46 oriented in longitudinal direction 120 which are formed in a wedge shape with triangular cross section and are arranged in radial direction.

REFERENCE CHARACTERS

10 filter element
12 filter bellows
14 first end disk
16 second end disk
26 end face
28 end face
30 central tube
32 end
34 bulge
36 second connection device
38 collar
40 measurement
42 deflection element
43 control surface
44 reinforcement rib
46 support element
48 pretension element
50 raw fluid region
52 clean fluid region
60 secondary element
62 end
64 end
66 filter medium
70 end disk
72 first connection device
74 lock element
76 lock hook
78 bulge
80 longitudinal direction secondary element
82 distance
84 counter holding surface
100 filter system
102 inlet socket
104 outlet socket
110 filter housing
112 housing bottom part
114 housing top part
118 connection element
120 longitudinal direction filter system

What is claimed is:

1. A secondary element for a filter system, the secondary element comprising:

a filter medium arranged about a longitudinal direction of the secondary element;

a first end and a second end oppositely positioned relative to each other along the longitudinal direction;

wherein the first end is seal-tightly closed by a closed end disk and the second end is open;

wherein the closed end disk comprises a first connection device configured to interact, upon intended mounting of the secondary element in the filter system, with a complementary second connection device of a central tube of the filter system and configured to fix the secondary element on the central tube;

wherein the first connection device comprises lock elements with radially inwardly oriented lock hooks, wherein the lock hooks are arranged distributed on an outer circumference of the closed end disk;

wherein the filter medium surrounds the lock elements;

wherein the lock elements include two directly neighboring lock elements, wherein a distance of the two directly neighboring lock elements relative to each other along the outer circumference of the closed end disk is larger than a measurement of a deflection element arranged at a collar of the central tube and oriented radially outwardly in relation to the collar, wherein the measurement is measured in a circumferential direction of the collar.

2. The secondary element according to claim 1, wherein the closed end disk comprises a bulge projecting outwardly in the longitudinal direction.

3. The secondary element according to claim 1, wherein the lock elements are grouped on the outer circumference of the closed end disk.

4. The secondary element according to claim 3, wherein the lock elements are grouped such that a respective lock element comprises a smaller distance to a directly neighboring lock element on one side along the outer circumference of the closed end disk than to a neighboring lock element on the other side along the outer circumference of the closed end disk.

5. The secondary element according to claim 1, wherein the closed end disk is fixedly connected to the filter medium.

6. The secondary element according to claim 5, wherein the closed end disk is connected by welding or gluing or molding to the filter medium.

7. A filter system for filtering a fluid, the filter system comprising a housing;

an inlet socket arranged at the housing for supply of a fluid to be filtered;

an outlet socket arranged at the housing for discharge of a filtered fluid;

a filter element arranged between the inlet socket and the outlet socket;

a central tube arranged in an interior of the housing along a longitudinal direction of the filter system and configured to receive the filter element;

a secondary element arranged in an interior of the filter element, wherein the central tube carries the secondary element;

wherein the secondary element comprises a first connection device and wherein the central tube comprises a second connection device, wherein the first connection device and the second connection device are complementary to each other and configured to connect an end of the secondary element and an end of the central tube to each other;

wherein the secondary element comprises a closed end disk arranged at the end of the secondary element;

wherein the first connection device of the secondary element comprises lock elements arranged distributed on an outer circumference of the closed end disk, wherein the lock elements comprise radially inwardly oriented lock hooks;

wherein the second connection device of the central tube comprises a circumferentially extending collar arranged at the end of the central tube;

wherein the lock elements, in an intended mounted state of the secondary element on the central tube, are locked by the lock hooks at the circumferentially extending collar and fix the secondary element in the longitudinal direction of the filter system;

wherein the central tube comprises at least one deflection element arranged at the circumferentially extending collar, wherein the at least one deflection element is oriented radially outwardly;

wherein the lock elements include two directly neighboring lock elements, wherein a distance of the two directly neighboring lock elements along the outer circumference of the closed end disk is larger than a measurement of the at least one deflection element measured in a circumferential direction of the circumferentially extending collar.

8. The filter system according to claim 7 wherein the outlet socket is arranged centrally in the longitudinal direction of the filter system.

9. The filter system according to claim 7, wherein the first connection device and the second connection device are configured to be detachable from each other without being destroyed.

10. The filter system according to claim 7, wherein the end of the secondary element projects axially past the central tube.

11. The filter system according to claim 7, wherein the secondary element comprises a bulge and wherein the central tube at the end provided with the second connection device comprises a bulge conforming in shape to the bulge of the secondary element.

12. The filter system according to claim 11, wherein the bulge of the central tube is a flexible rib structure.

13. The filter system according to claim 11, wherein the bulge of the secondary element has a truncated cone shape and the bulge of the central tube has a truncated cone shape, wherein the truncated cone shape of the bulge of the secondary element conforms to the truncated cone shape of the bulge of the central tube.

14. The filter system according to claim 7, wherein the lock elements are grouped on the outer circumference of the closed end disk.

15. The filter system according to claim 14, wherein the lock elements are grouped such that a respective lock element comprises a smaller distance to a directly neighboring lock element on one side along the outer circumference of the closed end disk than to a neighboring lock element on the other side along the outer circumference of the closed end disk.

16. The filter system according to claim 7, wherein the at least one deflection element is arranged at a circumferential position of a reinforcement rib of the central tube.

17. The filter system according to claim 7, wherein the circumferentially extending collar comprises support elements oriented in the longitudinal direction of the filter system, wherein the support elements, in the intended mounted state of the secondary element on the central tube, contact an inwardly oriented counter holding surface of the closed end disk of the secondary element.

18. The filter system according to claim 17, wherein the secondary element, in the intended mounted state of the secondary element on the central tube, is clamped by the support elements in the longitudinal direction of the filter system.

19. The filter system according to claim 7, further comprising a pretension element configured to secure the secondary element at the central tube.

20. The filter system according to claim 7, wherein the filter element seals radially inwardly at an end face thereof arranged at the outlet socket.

* * * * *